(12) United States Patent
Zhao et al.

(10) Patent No.: US 12,044,322 B1
(45) Date of Patent: Jul. 23, 2024

(54) LARGE-VOLUME LIQUID FIXED-RATIO MULTI-BATCH MIXING VALVE

(71) Applicant: SHANDONG UNIVERSITY OF SCIENCE AND TECHNOLOGY, Qingdao (CN)

(72) Inventors: Ziliang Zhao, Qingdao (CN); Zhenguo Lu, Qingdao (CN); Hongbin Wang, Qingdao (CN); Qingliang Zeng, Qingdao (CN); Changjiang Li, Qingdao (CN); Long Gao, Qingdao (CN); Hong Song, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 0 days.

(21) Appl. No.: 18/566,716

(22) PCT Filed: Dec. 28, 2021

(86) PCT No.: PCT/CN2021/141837
§ 371 (c)(1),
(2) Date: Dec. 4, 2023

(87) PCT Pub. No.: WO2022/267415
PCT Pub. Date: Dec. 29, 2022

(30) Foreign Application Priority Data

Jun. 23, 2021 (CN) .......................... 202110700637.1

(51) Int. Cl.
*F16K 11/22* (2006.01)
*F16K 31/04* (2006.01)
*F16K 31/53* (2006.01)

(52) U.S. Cl.
CPC ............ *F16K 11/22* (2013.01); *F16K 31/041* (2013.01); *F16K 31/535* (2013.01)

(58) Field of Classification Search
CPC .............................. F16K 11/22; F16K 31/041
See application file for complete search history.

(56) References Cited

U.S. PATENT DOCUMENTS

2019/0055954 A1* 2/2019 Egawa .................. F04D 29/057
2019/0271325 A1* 9/2019 Masuda ................ F04D 29/041
(Continued)

FOREIGN PATENT DOCUMENTS

CN        113418030 A      9/2021
WO     2022/267415 A1    12/2022

OTHER PUBLICATIONS

Notice of Grant issued in Chinese Application No. 202110700637.1; dated May 20, 2022; 3 pgs.
(Continued)

*Primary Examiner* — Kevin R Barss
(74) *Attorney, Agent, or Firm* — HAUPTMAN HAM, LLP

(57) ABSTRACT

A volume liquid fixed-ratio multi-batch mixing valve includes a valve body, including a first inlet liquid chamber, a second inlet liquid chamber and a mixing chamber; a first valve core, controlling liquid inflow into the first inlet liquid chamber; a second valve core, controlling liquid inflow into the second inlet liquid chamber; a liquid drainage valve core, controlling liquid drainage; a rotary shaft includes a first impeller and a second impeller. The first impeller and the second impeller alternately control flow to the first inlet liquid chamber and the second inlet liquid chamber and to the second inlet liquid chamber and the mixing chamber. The first impeller and the second impeller are symmetrically about the rotary shaft; when the first inlet liquid chamber and the second inlet liquid chamber are communicated, the second valve core closes the second inlet liquid chamber and the mixing chamber.

10 Claims, 4 Drawing Sheets

(56) References Cited

U.S. PATENT DOCUMENTS

2020/0025214 A1\* 1/2020 Wang ...................... F04D 17/10
2020/0158351 A1\* 5/2020 Blad ................... F04D 15/0066
2020/0182487 A1\* 6/2020 Jang ........................ F02B 33/40

OTHER PUBLICATIONS

Search Report issued in Chinese Application No. 202110700637.1; dated May 15, 2022; 5 pgs.
International Search Report and Written Opinion issued in International Application No. PCT/CN2021/141837; mailed Mar. 30, 2022; 17 pgs.

\* cited by examiner

LARGE-VOLUME LIQUID FIXED-RATIO MULTI-BATCH MIXING VALVE

TECHNICAL FIELD

The present disclosure relates to the technical field of chemical machinery and in particular to a large-volume liquid fixed-ratio multi-batch mixing valve.

This application is a U.S. National Phase of International Application Number PCT/CN2021/141837 filed Dec. 28, 2021, and claims priority to Chinese Patent Application No. 202110700637.1 entitled "LARGE-VOLUME LIQUID FIXED-RATIO MULTI-BATCH MIXING VALVE" filed on Jun. 23, 2021, the entire content of which is incorporated herein by reference.

BACKGROUND

In the modern chemical technologies, mixing valves are used to control two or more solutions to be injected or drained to achieve the purpose of mixing the solutions. On the existing production flow lines of the factories, there is a working condition under which two solutions A and B are usually to be mixed at a specific ratio. In the conventional processes, two solutions are mixed at a ratio manually in advance and then conveyed to the production lines for use in operation. But, this method has the following disadvantages.

1. The conventional manual mixing process requires human labor to perform the mixing operation. When some corrosive or poisonous liquids are to be mixed manually, harm may be brought to the human bodies.

2. On the production lines of the factories, it is required to pour the solution A into a container in advance during manual mixing operation, and then pour the solution B into the container. When the desired solutions A and B have a large volume, it takes a long time to fully mix the solutions A and B, lowering the production efficiency.

3. The conventional mixing valves control a flow rate of the solutions by an operation handle. When the mixing operation of the solutions is to be performed, it is required to determine the solution volumes in advance based on the blending ratio of the two solutions according to the actual working conditions and perform manual injection by hand.

4. The conventional mixing valves are used only to mix two solutions without considering solution mixing time and solution mixing volume. In this case, two large-volume solutions are mixed for a short time in the mixing valve, affecting the product quality.

SUMMARY

According to various embodiments of the present disclosure, there is provided a large-volume liquid fixed-ratio multi-batch mixing valve to ensure full mixing of solutions.

The present disclosure provides a large-volume liquid fixed-ratio multi-batch mixing valve, which includes:
  a valve body, including a first inlet liquid chamber, a second inlet liquid chamber and a mixing chamber;
  a first valve core, disposed in the first inlet liquid chamber to control liquid inflow into the first inlet liquid chamber;
  a second valve core, disposed in the second inlet liquid chamber to control liquid inflow into the second inlet liquid chamber;
  a liquid drainage valve core, disposed in the mixing chamber to control liquid drainage;
  a rotary shaft, disposed in the valve body and driven to rotate;
  a first impeller, fixed on the rotary shaft, where the first impeller is capable of rotating along with the rotary shaft to enable the first inlet liquid chamber and the second inlet liquid chamber to be communicated and cut off alternately, and the first valve core is capable of rotating in synchronization with the first impeller to close upon the communication of the first inlet liquid chamber and the second inlet liquid chamber and open upon the cutoff of the first inlet liquid chamber and the second inlet liquid chamber;
  a second impeller, fixed on the rotary shaft, where the second impeller is capable of rotating along with the rotary shaft to enable the second inlet liquid chamber and the mixing chamber to be alternately communicated and cut off, and the second valve core is capable of rotating in synchronization with the second impeller to close upon the communication of the second inlet liquid chamber and the mixing chamber and open upon the cutoff of the second inlet liquid chamber and the mixing chamber;
  where the first impeller and the second impeller are disposed symmetrically around the rotary shaft to form an inverse proportional relationship between communication aperture sizes.

As a preferred technical solution of the large-volume liquid fixed-ratio multi-batch mixing valve, an opening-closing angle of the first valve core is in positive proportional relationship with the communication aperture size formed by the first impeller during rotation; and an opening-closing angle of the second valve core is in positive proportional relationship with the communication aperture size formed by the second impeller during rotation.

As a preferred technical solution of the large-volume liquid fixed-ratio multi-batch mixing valve, the first valve core and the second valve core are respectively in transmission connection with the rotary shaft such that the first valve core and the second valve core are rotated under the drive of the rotary shaft.

As a preferred technical solution of the large-volume liquid fixed-ratio multi-batch mixing valve, the first valve core and the second valve core are connected with the rotary shaft respectively by a first transmission piece, and a plurality of first transmission pieces are replaceably mounted in the valve body, where each of the first transmission pieces has a different transmission ratio.

As a preferred technical solution of the large-volume liquid fixed-ratio multi-batch mixing valve, the liquid drainage valve core includes a coarse adjustment mechanism movable relative to a liquid drainage opening of the mixing chamber and a fine adjustment mechanism opposed to the coarse adjusting mechanism.

As a preferred technical solution of the large-volume liquid fixed-ratio multi-batch mixing valve, the liquid drainage valve core includes an adjustment net provided with a plurality of water-out net holes, and the coarse adjustment mechanism and the fine adjustment mechanism are movable relative to the adjustment net respectively to block a water baffle plate of the water-out net holes.

As a preferred technical solution of the large-volume liquid fixed-ratio multi-batch mixing valve, the coarse adjustment mechanism is provided with a plurality of water-through net holes and the coarse adjustment mechanism is movable relative to the adjustment net to staggeredly adjust a flow rate by the water-through net holes and the water-out net holes.

As a preferred technical solution of the large-volume liquid fixed-ratio multi-batch mixing valve, the mixing valve further includes a mixing piece, which is disposed in the mixing chamber.

As a preferred technical solution of the large-volume liquid fixed-ratio multi-batch mixing valve, along a solution drainage direction, the mixing piece is a mixing drum disposed at an outer side of the liquid drainage valve core.

As a preferred technical solution of the large-volume liquid fixed-ratio multi-batch mixing valve, the mixing valve further includes a second transmission piece in transmission connection with the rotary shaft, where a plurality of mixing valves are in transmission connection via the second transmission piece.

With the above technical solutions, the present disclosure has the following beneficial effects.

1. In the present disclosure, the valve body is divided into a first inlet liquid chamber, a second inlet liquid chamber and a mixing chamber; the first impeller and the second impeller are used to respectively control the first inlet liquid chamber and the second inlet liquid chamber to be communicated or cut off and the second inlet liquid chamber and the mixing chamber to be communicated or cut off; and further, with cooperation of the first valve core, the second valve core and the liquid drainage valve core, when the first inlet liquid chamber and the second inlet liquid chamber are communicated, one solution can enter the first inlet liquid chamber and the second inlet liquid chamber and the other solution cannot enter the second inlet liquid chamber due to closing of the second valve core; when the second inlet liquid chamber and the mixing chamber are communicated, the second valve core is opened while the first valve core is closed, and the two solutions can be fully mixed in the mixing chamber and then under the control of the liquid drainage valve core, drained out, so as to improve the mixing efficiency of the solutions.

2. In the present disclosure, the first impeller and the second impeller are symmetrically disposed around the rotary shaft, namely, during the rotation of the rotary shaft, the first impeller gradually reduces the communication aperture of the first inlet liquid chamber and the second inlet liquid chamber, while the second impeller gradually increases the communication aperture of the second inlet liquid chamber and the mixing chamber, until the first inlet liquid chamber and the second inlet liquid chamber are fully communicated and the second inlet liquid chamber and the mixing chamber are completely cut off; and during the continued rotation, the first impeller gradually increases the communication aperture of the first inlet liquid chamber and the second inlet liquid chamber, while the second impeller gradually reduces the communication aperture of the second inlet liquid chamber and the mixing chamber, and this process goes on repeatedly like this. There is an inverse proportional relationship between the communication aperture sizes formed by the first impeller and the second impeller. By this process change, two solutions can be mixed together in batches so as to improve mixing efficiency.

3. In the present disclosure, since the first inlet liquid chamber and the second inlet liquid chamber are chambers with fixed volume, when one solution enters the first inlet liquid chamber, its volume is controllable, and when the first inlet liquid chamber and the second inlet liquid chamber are communicated, a total volume after the other solution enters is also controllable, where the first valve core is closed at this time. Therefore, a ratio at which the rotary shaft mixes the two solutions by completing one rotation is a fixed ratio, which is more helpful to achieving the control over the solution mixing ratio.

4. In the present disclosure, by limiting the opening-closing angle of the first valve core to be in positive proportional relationship with the communication aperture size of the first inlet liquid chamber and the second inlet liquid chamber formed by the first impeller during rotation, and by limiting the opening-closing angle of the second valve core to be in positive proportional relationship with the communication aperture size of the second inlet liquid chamber and the mixing chamber formed by the second impeller during rotation, the mixing ratio of the two solutions can be controlled by controlling a liquid inflow amount, so as to achieve the purpose of improving the mixing effect.

5. In the present disclosure, the first valve core and the second valve core are respectively connected with the rotary shaft via the first transmission pieces which can be replaced; by changing the parameters of the first transmission pieces cooperating with the first valve core and the second valve core respectively, a transmission ratio of the rotary shaft to the first valve core and the second valve core can be changed such that the first impeller and the second impeller can control the communication aperture size of the first inlet liquid chamber and the second inlet liquid chamber and the communication aperture size of the second inlet liquid chamber and the mixing chamber, so as to effectively adjust the mixing ratio of the two solutions.

6. In the present disclosure, the coarse and fine adjustment mechanisms are disposed to control the flow rate during liquid drainage. The coarse adjustment mechanism is used to control drainage of the mixed solution at a large flow rate, and the fine adjustment mechanism is used to perform secondary adjustment on the basis of the coarse adjustment mechanism, so as to achieve fine adjustment, ensuring solution mixing time and improving the product quality.

7. In the present disclosure, a mixing piece is disposed in the mixing chamber such that under the mixing action of the mixing piece, the drained solutions can be fully mixed, improving the mixing efficiency.

8. In the present disclosure, the second transmission piece disposed on the rotary shaft is connected to a plurality of mixing valves to further achieve control for multiple mixed solutions.

BRIEF DESCRIPTIONS OF THE DRAWINGS

The drawings described herein are used to provide further understanding and constitute a part of the present disclosure. The illustrative embodiments and the specifications of the present disclosure are used to interpret the present disclosure rather than constitute improper limitation to the present disclosure.

Figure 1:
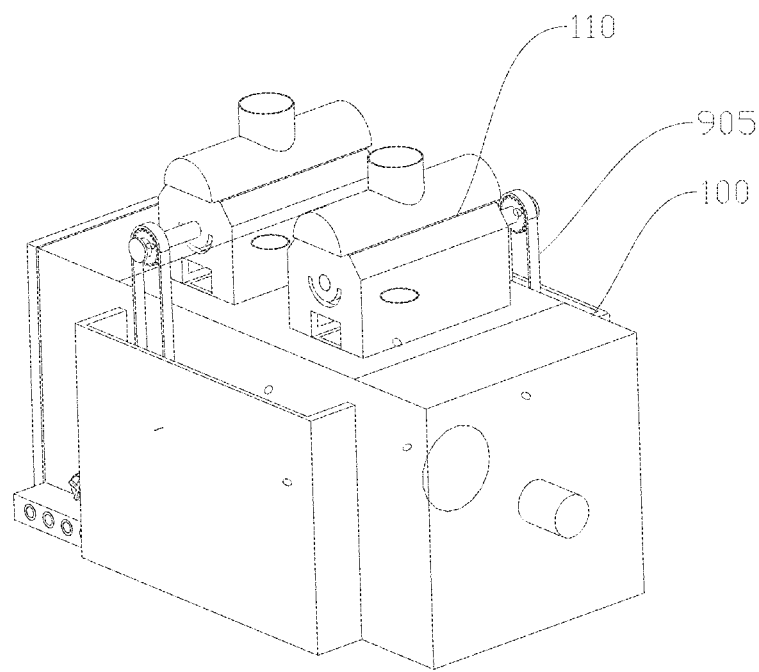
FIG. 1 is an entire schematic diagram illustrating a mixing valve according to an embodiment of the present disclosure.

Numerals of the drawings are described below:
100. valve body, 101. first inlet liquid chamber, 102. second inlet liquid chamber, 103. mixing chamber, 200. first valve core, 300. second valve core, 400. liquid drainage valve core, 401. coarse adjustment mechanism, 411. water-through net hole, 402. fine adjustment mechanism, 403. adjustment net, 404. water baffle plate, 500. rotary shaft, 501. bearing, 502. spring seat, 503. spring, 504. baffle plate, 600. first impeller, 700. second impeller, 800. servo motor, 900. first transmission piece, 901. first bevel gear, 902. transmission shaft, 903. second bevel gear, 904. drive gear, 905. chain, 906. driven shaft, 110. inlet water connection pipe, 120. inlet water connection piece, 130. mixing piece, 140. end plate, 150. connection opening, 160. second transmission piece, 161. third bevel gear, 162. external connection gear.

EMBODIMENTS

In order to more clearly set forth the entire idea of the present disclosure, detailed descriptions will be made below with examples in combination with accompanying drawings.

It is noted that many specific details are described in the following descriptions to fully understand the present disclosure. But, the present disclosure can be carried out in a way different from described herein and thus, the scope of protection of the present disclosure is not limited by the specific embodiments described below.

In the descriptions of the present disclosure it is understood that orientation or positional relationship indicated by the terms such as "central", "upper", "lower", "front", "rear", "left", "right", "vertical", "horizontal", "top", "bottom", "inside", "outside", "axial", "radial", and "circumferential" is used only for ease of descriptions and simplification of descriptions and does not indicate or imply that the indicated devices or elements must have a particular orientation, or be constructed or operated in a particular orientation. Therefore, such terms shall not be understood as limiting of the present disclosure.

In the present disclosure, unless otherwise clearly stated or defined, the terms "mount", "connect", "couple", and "fix" and the like shall be understood in a broad sense, for example, may be fixed connection, or detachable connection, or formed into one piece; or direct connection or indirect connection through an intermediate medium, or may be internal communication between two elements or mutual interaction of two elements. It is noted that the direct connection means that two elements are not connected through a transitional structure but formed into one piece through a connection structure. Persons of ordinary skills in the arts can understand the specific meanings of the above terms in the present disclosure based on actual situations.

In the present disclosure, unless otherwise clearly stated or defined, the first feature being "on" or "below" the second feature refers to that the first feature and the second feature are in direct contact, or the first feature and the second feature are in indirect contact through an intermediate medium. In the descriptions of the present disclosure, the descriptions of the reference terms "one embodiment", "some embodiments", "examples", "specific examples" or "some examples" or the like are meant to the specific features, structures, materials or characteristics described in combination with the embodiments or examples are included in at least one embodiment or example of the present disclosure. In the present disclosure, the illustrative expressions of the above terms are not necessarily directed toward same embodiments or examples. Further, the described specific features, structures, materials or characteristics may be combined in a proper way in one or more embodiments or examples. The following technical solution is employed.

As shown in FIGS. 1 to 4, one or more embodiments provide a large-volume liquid fixed-ratio multi-batch mixing valve, which includes: a valve body 100, a first valve core 200, a second valve core 300, a liquid drainage valve core 400, a rotary shaft 500, a first impeller 600 and a second impeller 700. Detailed descriptions are made below with the first valve core 200 controlling a solution A and the second valve core 300 controlling a solution B.

The valve body 100 includes a first inlet liquid chamber 101, a second inlet liquid chamber 102 and a mixing chamber 103. The first valve core 200 is disposed in the first inlet liquid chamber 101 to control the solution A to enter the first inlet liquid chamber 101. The second valve core 300 is disposed in the second inlet liquid chamber 102 to control the solution B to enter the second inlet liquid chamber 102. The liquid drainage valve core 400 is disposed in the mixing chamber 103 to control a mixed solution of the solutions A and B to be drained. The rotary shaft 500 is disposed in the valve body 100 and driven to rotate. The first impeller 600 is fixed the rotary shaft 500 and disposed between the first inlet liquid chamber 101 and the second inlet liquid chamber 102. The first impeller 600 can rotate along with the rotary shaft 500 to enable the first inlet liquid chamber 101 and the second inlet liquid chamber 102 to be alternately communicated and cutoff. The first valve core 200 can rotate in synchronization with the first impeller 600 to close upon communication of the first inlet liquid chamber 101 and the second inlet liquid chamber 102 and open upon cutoff of the first inlet liquid chamber 101 and the second inlet liquid chamber 102. The second impeller 700 is fixed on the rotary shaft 500 and disposed between the second inlet liquid chamber 102 and the mixing chamber 103. The second impeller 700 can rotate along with the rotary shaft 500 to enable the second inlet liquid chamber 102 and the mixing chamber 103 to be communicated and cutoff alternately. The second valve core 300 can rotate in synchronization with the second impeller 700 to close upon communication of the second inlet liquid chamber 102 and the mixing chamber 103 and open upon cutoff of the second inlet liquid chamber 102 and the mixing chamber 103.

The first impeller 600 and the second impeller 700 are disposed symmetrically around the rotary shaft 500 to form an inverse proportional relationship between communication aperture sizes during rotation so as to achieve sequential control on the two solutions. When the first inlet liquid chamber 101 and the second inlet liquid chamber 102 are communicated, the second inlet liquid chamber 102 and the mixing chamber are cut off and the second valve core 300 is driven to close; when the first inlet liquid chamber 101 and the second inlet liquid chamber 102 are cut off, the second inlet liquid chamber 102 and the mixing chamber 103 are communicated, and the first valve core 200 is driven to close.

The rotary shaft 500 may be powered by a servo motor 800. When the servo motor 800 brings the rotary shaft 500 to rotate, the first impeller 600 and the second impeller 700 rotate along with the rotary shaft 500. The first impeller 600 controls the solution A to flow through the first inlet liquid chamber 101 into the second inlet liquid chamber 102, and the second impeller 700 controls the mixed solution of the solutions A and B to flow through the second inlet liquid chamber 102 into the mixing chamber 103. The rotation of the rotary shaft 500 under the drive of the servo motor 800 can achieve up and down alternate rotation of the first impeller 600 and the second impeller 700 to ensure the solution B will not flow out of the second inlet liquid chamber 102 while the solution A flows through the first inlet liquid chamber 101 into the second inlet liquid chamber 102, so as to ensure the solutions A and B are uniformly mixed and drained together. In order to maintain transmission of the servo motor 800 for the rotary shaft 500, the rotary shaft 500 is sequentially run through a bearing 501, a spring seat 502 and a spring 503 to connect with an output shaft of the servo motor 800 in a transmission way. The rotary shaft 500 is provided with a baffle plate 504 to prevent the solutions from affecting the servo motor 800. The spring seat 502 is abutted against the baffle plate 504 through the bearing 501 to improve mounting convenience and ensure reliable transmission.

Figure 3:
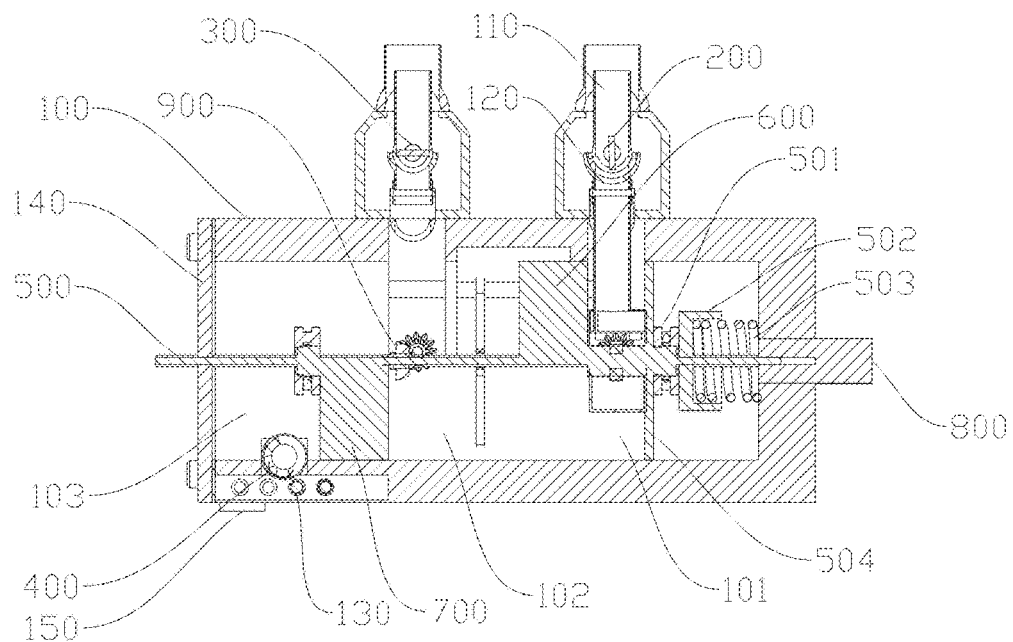
FIG. 3 is a sectional view taken along line A-A in FIG. 2.
Figure 4:
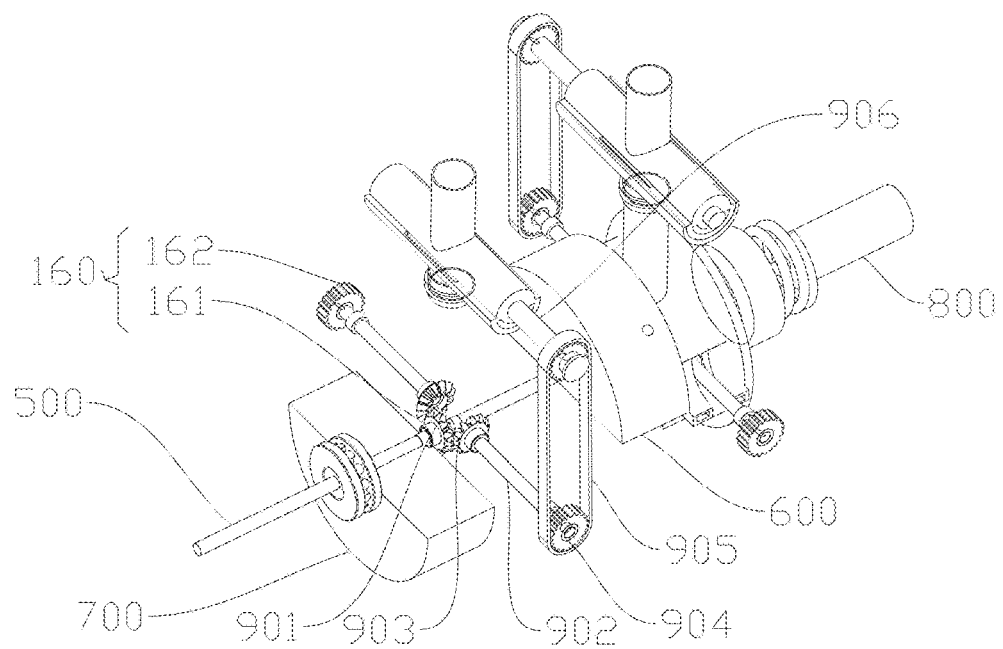
FIG. 4 is a structural schematic diagram illustrating a transmission part of a mixing valve according to an embodiment of the present disclosure.

In the present disclosure, the connection relationship of the first impeller 600 and the second impeller 700 with the rotary shaft 500 is not specifically limited. In one embodiment, the first impeller 600 and the second impeller 700 both are fixed on the rotary shaft by key connection, and the initial positions of the first impeller 600 and the second impeller 700 are symmetrical about an axial plane of the rotary shaft 500 as shown in FIGS. 3 and 4. A diameter of the first impeller 600 is equal to a size of a water inlet between the first inlet liquid chamber 101 and the second inlet liquid chamber 102, and a diameter of the second impeller 700 is equal to a size of a water inlet between the second inlet liquid chamber 102 and the mixing chamber 103, to ensure the solutions A and B flow in sequentially. During the rotation of the rotary shaft 500, the first impeller 600 gradually reduces the communication aperture of the first inlet liquid chamber 101 and the second inlet liquid chamber 102, while the second impeller 700 gradually increases the communication aperture of the second inlet liquid chamber 102 and the mixing chamber 103, until the first inlet liquid chamber 101 and the second inlet liquid chamber 102 are fully communicated, and the second inlet liquid chamber 102 and the mixing chamber 103 are completely cut off; and during the continued rotation, the first impeller 600 gradually increases the communication aperture of the first inlet liquid chamber 101 and the second inlet liquid chamber 102, while the second impeller 700 gradually reduces the communication aperture of the second inlet liquid chamber 102 and the mixing chamber 103, and this process goes on repeatedly like this. There is an inverse proportional relationship between the communication aperture sizes formed by the first impeller 600 and the second impeller 700. By this process change, two solutions can be mixed together in batches so as to improve mixing efficiency.

In the present disclosure, the valve body 100 is divided into a first inlet liquid chamber 101, a second inlet liquid chamber 102 and a mixing chamber 103; the first impeller 600 and the second impeller 700 are used to respectively control the first inlet liquid chamber 101 and the second inlet liquid chamber 102 to be communicated or cut off and the second inlet liquid chamber 102 and the mixing chamber 103 to be communicated or cut off; and further, with cooperation of the first valve core 200, the second valve core 300 and the liquid drainage valve core 400, when the first inlet liquid chamber 101 and the second inlet liquid chamber 102 are communicated, the solution A can enter the first inlet liquid chamber 101 and the second inlet liquid chamber 102 and the solution B cannot enter the second inlet liquid chamber 102 due to closing of the second valve core 300; when the second inlet liquid chamber 102 and the mixing chamber 103 are communicated, the second valve core 300 is opened while the first valve core 200 is closed, and the two solutions can be fully mixed in the mixing chamber 103 and then under the control of the liquid drainage valve core 400, drained out, so as to improve the mixing efficiency of the solutions. The apparatus has good time effectiveness and can achieve continuous operation, which avoids non-uniform mixing of large-volume solutions.

Furthermore, since the first inlet liquid chamber 101 and the second inlet liquid chamber 102 are chambers with fixed volume, when the solution A enters the first inlet liquid chamber 101, its volume is controllable, and when the first inlet liquid chamber 101 and the second inlet liquid chamber 102 are communicated, a total volume after the solution B enters is also controllable, where the first valve core 200 is closed at this time. Therefore, a ratio at which the rotary shaft 500 mixes the two solutions by completing one rotation is a fixed ratio, which is more helpful to achieving the control over the solution mixing ratio.

In one implementation, an opening-closing angle of the first valve core 200 is in positive proportional relationship with the communication aperture size between the first inlet liquid chamber 101 and the second inlet liquid chamber 102 formed by the first impeller 600 during rotation; an opening-closing angle of the second valve core 300 is in positive proportional relationship with the communication aperture size between the second inlet liquid chamber 102 and the mixing chamber 103 formed by the second impeller 700 during rotation. The mixing ratio of the two solutions can be controlled by controlling a liquid inflow amount, so as to achieve the purpose of improving the mixing effect.

In a preferred embodiment, the first valve core 200 and the second valve core 300 rotate in synchronization with the rotary shaft 500 to improve the mixing efficiency. Specifically, the first valve core 200 and the second valve core 300 are respectively connected with the rotary shaft 500 in a transmission way such that the rotary shaft 500 drives through rotation the first valve core 200 and the second valve core 300. During the mixing process, each time the rotary shaft 500 rotates to drive the rotation of the first impeller 600 and the second impeller 700 so as to adjust the communication aperture of each chamber, the first valve core 200 and the second valve core 300 rotate to adjust the liquid inflow amount to be positively correlated with the opening-closing aperture size of the chambers. As shown in FIGS. 3 and 4, in a specific embodiment, the first valve core 200 and the second valve core 300 are connected to the rotary shaft 500 via a first transmission piece 900 respectively; a plurality of first transmission pieces 900 are replaceably mounted in the valve body 100 and each first transmission piece 900 has a different transmission ratio. The first transmission piece 900 may be a bevel gear group including a first bevel gear 901 fixed on the rotary shaft 500 and a second bevel gear 903 fixed on a transmission shaft 902. The transmission shaft 902 is in transmission connection with the first valve core 200 or the second valve core 300 to control the opening or closing of the first valve core 200 and the second valve core 300. A drive gear 904 may be disposed on the transmission shaft 902 to drive a chain 905 connected to a driven shaft 906 which is connected to the first valve core 200 or the second valve core 300.

The working process is as follows: with the inflow process of the solution A as an example, the servo motor 800 drives the rotation of the rotary shaft 500; since the first bevel gear 901 is key-connected to the rotary shaft 500, the movement of the rotary shaft 500 brings the first bevel gear 901 to rotate, where the first bevel gear 901 achieves rotation by engaging with the second bevel gear 903. The first bevel gear 901 is key-connected to the transmission shaft 902 to drive the rotation of the transmission shaft 902, and the transmission shaft 902 drives the drive gear 904 to rotate so as to transmit power through the chain 905 disposed at the water inlet of the solution A to the driven shaft 906 connected to the first valve core 200. By adjusting the rotation speed of the servo motor 800 and the transmission ratio of the bevel gear group, control can be achieved on the flow rate of the mixing valve.

The bevel gear group is distributed at both sides of the rotary shaft 500 along an axial direction of the rotary shaft 500. The flow rate control part of the solution A is powered by the left bevel gear to perform clockwise rotation; and the flow rate control part of the solution B is powered by the right bevel gear to perform counterclockwise rotation. Finally, the first valve core 200 rotates clockwise and the second valve core 300 rotates counterclockwise.

As shown in FIG. 3, in practical applications, the first valve core 200 acting on the solution A is disposed in an inlet water connection pipe 110 into which the solution A is input, and an inlet water connection piece 120 is disposed below to communicate with the first inlet liquid chamber 101. Preferably, the diameter of the disposed first valve core 200 is equal to the diameter of the inlet water connection pipe 110, and both diameters are less than the diameter of the inlet water connection piece 120 to ensure rotational control of the first valve core 200. When the first valve core 200 rotates to a different angle, the inflow state of the solution A will be changed. When the first valve core 200 rotates to a horizontal direction, the first valve core 200 is overlapped with a lower surface of the inlet water connection pipe 100 and the solution A will stop flowing in. When the first valve core 200 rotates to a vertical direction, the inlet water connection pipe 110 is fully in communication with the inlet water connection piece 120 below and the inflow rate of the solution A is at maximum. The flow rate control part of the solution B has the same principle and will not be repeated herein.

During solution mixing process, it is defaulted that the initial states of the first valve core 200 and the second valve core 300 are a vertical state and a horizontal state respectively. When the mixing valve starts working, the first valve core 200 is in a vertical state and the solution A firstly flows into the first inlet liquid chamber 101. The first impeller 600 is located at bottom. Under the control of the servo motor 800, the first valve core 200 rotates from the vertical state to the horizontal state and meanwhile the second valve core 300 rotates from the horizontal state to the vertical state. The solution A stops flowing in and the solution B starts to flow into the second inlet liquid chamber 102. The first impeller 600 rotates to be at top and the second impeller 700 is located at bottom. The solution A flowing into the mixing valve flows out along a water-out direction to mix with the solution B. When the second impeller 700 rotates to be at top, the mixed solution of the solutions A and B enters the mixing chamber 103 and then flows out.

When there is no fixed ratio requirement for mixing the solutions A and B, different rotation speeds of the first valve core 200 and the second valve core 300 can complete the mixing of the solutions at different ratios. According to the calculation formula of the gear transmission ratio: transmission ratio=a ratio of the rotation speed of the drive gear to the rotation speed of the driven gear=a ratio of the tooth number of the driven gear to the tooth number of the drive gear.

In a specific embodiment, the tooth number of the bevel gears fixed on the rotary shaft 500 in the bevel gear group is 20; the tooth number of the bevel gear at the side of the solution A is 28 and the tooth number of the bevel gear at the side of the solution B is 20; the rotation speed of the motor is V and the efficiency is 0.95. In this case, it is known that the rotation speed of the first valve core 200 of the solution A and the rotation speed of the second valve core 300 of the solution B are in inverse proportional relationship, and the blending ratio of the solutions A and B and the rotation speeds of the first valve core 200 and the second valve core 300 are in inverse proportional relationship. The first valve core 200 and the second valve core 300 control the flow rates of the solutions A and B respectively such that in each reciprocation, the solutions A and B are mixed at the ratio of 1.4:1.

When there is a fixed ratio requirement for mixing the solutions A and B, the blending ratio of the solutions A and B can be satisfied by replacing gears so as to complete the fixed-ratio mixing of the large-volume mixed solution in batches, simplifying the blending process, ensuring the mixing time and improving the mixing efficiency.

Figure 2:
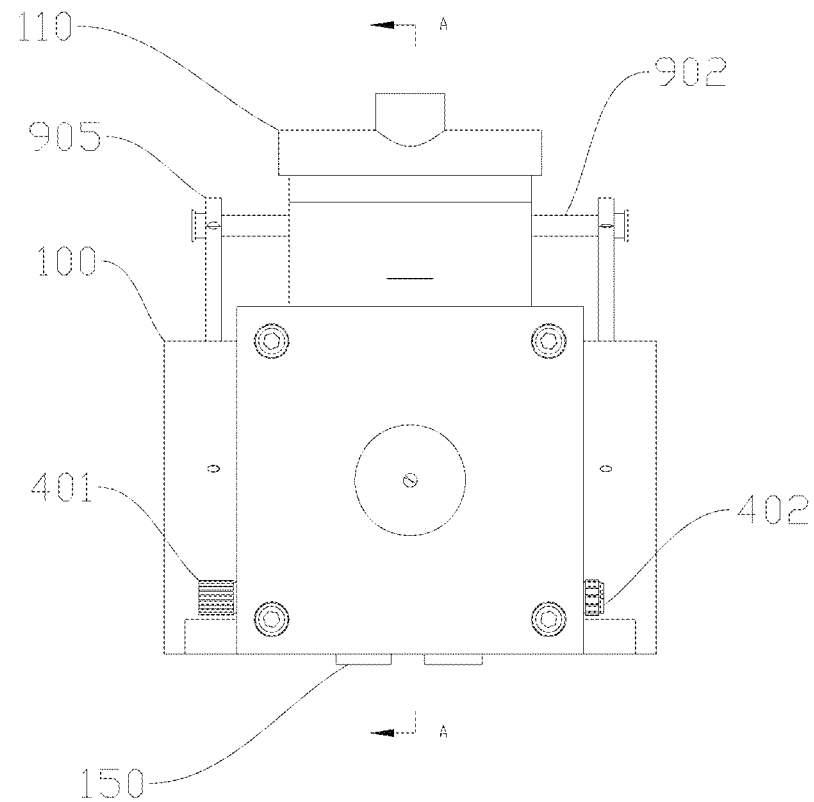
FIG. 2 is a right view of a mixing valve according to an embodiment of the present disclosure.
Figure 5:
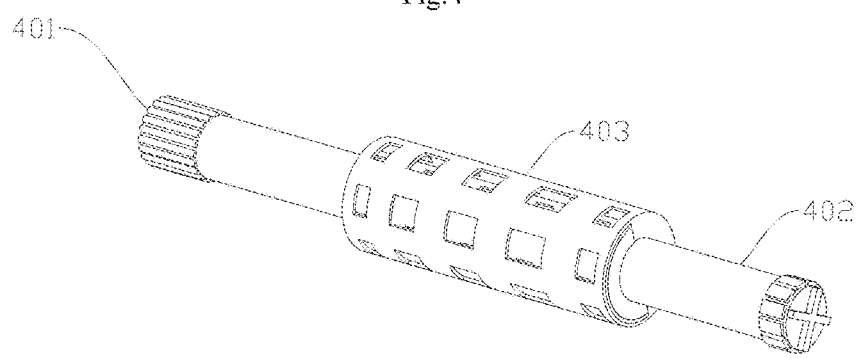
FIG. 5 is a structural schematic diagram illustrating a liquid drainage valve core according to an embodiment of the present disclosure.

As shown in FIGS. 2, 3 and 5, in one implementation, the liquid drainage valve core 400 includes a coarse adjustment mechanism 401 movable relative to a liquid drainage opening of the mixing chamber 103, and a fine adjustment mechanism 402 opposed to the coarse adjustment mechanism to achieve flow rate control during drainage. The coarse adjustment mechanism 401 is used to control drainage of the mixed solution at a large flow rate, and the fine adjustment mechanism is used to perform secondary adjustment on the basis of the coarse adjustment mechanism, so as to achieve fine adjustment, ensuring solution mixing time and improving the product quality.

Figure 6:
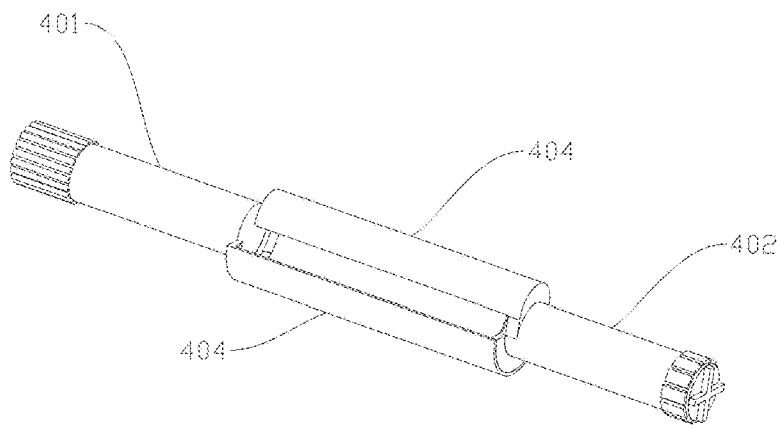
FIG. 6 is a cooperation diagram illustrating a fine adjustment mechanism and a coarse adjustment mechanism according to an embodiment of the present disclosure.
Figure 7:
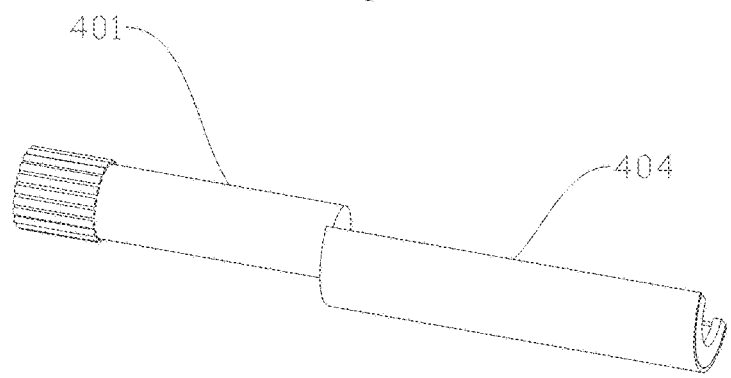
FIG. 7 is a structural schematic diagram illustrating a coarse adjustment mechanism according to an embodiment of the present disclosure.
Figure 8:
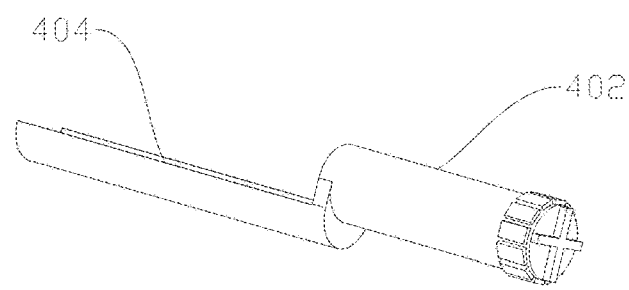
FIG. 8 is a structural schematic diagram illustrating a fine adjustment mechanism according to an embodiment of the present disclosure.

Specifically, the liquid drainage valve core 400 includes an adjustment net 403 provided with a plurality of water-out net holes, and the coarse adjustment mechanism 401 and the fine adjustment mechanism 402 are movable relative to the adjustment net 403 respectively to block a water baffle plate 404 of the water-out net holes (as shown in FIGS. 6 to 8). The mixed solution is drained out through the adjustment net 403. A plurality of rows of grids (preferably six rows) are uniformly disposed on the adjustment net 403, where the upper three rows of grids are responsible for inflow water control and the lower three rows of grids are responsible for outflow water control. The coarse adjustment mechanism 401 is responsible for an outflow rate of the coarse adjustment water outlet. The coarse adjustment mechanism 401 is shaped like arc, with its diameter equal to an inner circle diameter of the adjustment net 4.3 and its arc length equal to half of the adjustment net 403. The specific size of the fine adjustment mechanism 402 is consistent with the size of a single row of grids of the adjustment net 403 and is responsible for an inflow rate of the fine adjustment water outlet.

Furthermore, the coarse adjustment mechanism 401 can be located on the upper three rows of grids of the adjustment net 403 during rotation process and at this time, the mixing valve is in a water accumulation state to ensure the mixing time of the solutions A and B in the chamber of the mixing valve and hence ensure full mixing of the solutions A and B. By adjusting the position of the coarse adjustment mechanism 401 to change the number of covered grids, different outflow rates of the mixed solution can be achieved. The width of the fine adjustment mechanism 402 is equal to the width of a single row of grids of the adjustment net 403. By adjusting the fine adjustment mechanism 402 to block a single row of grids of the adjustment net 403, the inflow rate and outflow rate of the water outlet can be finely adjusted.

Figure 9:
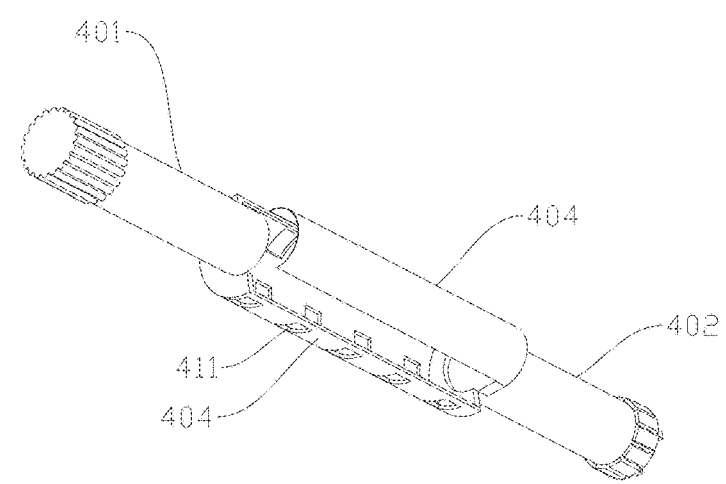
FIG. 9 is a cooperation diagram illustrating a fine adjustment mechanism and a coarse adjustment mechanism according to another embodiment of the present disclosure.

Different from the preceding embodiments, as shown in FIG. 9, in one implementation, the coarse adjustment mechanism 401 is provided with a plurality of water-through net holes 411 and the coarse adjustment mechanism 401 is movable relative to the adjustment net 403 to staggeredly adjust a flow rate by the water-through net holes 411 and the water-out net holes. In this improvement, all grids on the adjustment net 403 can be opened or closed by simply moving the coarse adjustment mechanism 401 by a relative distance of one row of grids. For example, if the coarse adjustment mechanism 401 is disposed as three rows of grids, all grids can be blocked or opened by simply moving the coarse adjustment mechanism 401 by a distance of a single row of grids.

Figure 10:
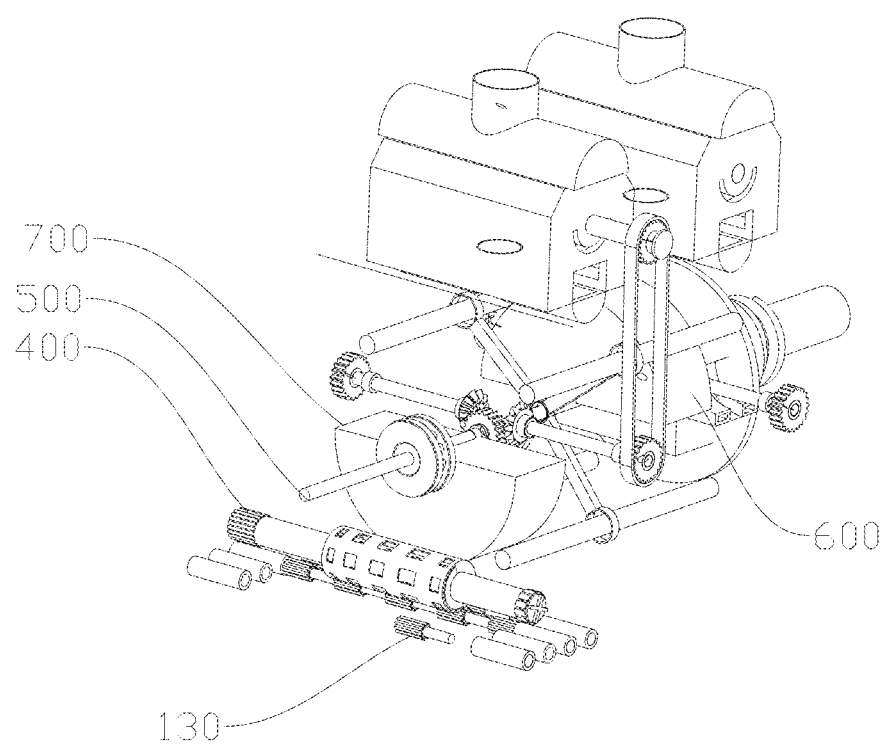
FIG. 10 is a schematic diagram illustrating a position of a mixing piece according to an embodiment of the present disclosure.

As shown in FIGS. 3 and 10, in one implementation, the mixing valve further includes a mixing piece 130 disposed in the mixing chamber 103. In one specific embodiment, the mixing piece 130 is movably disposed at a water outlet below the mixing chamber 103, that is, the mixing piece 130 can rotate in the mixing chamber 103 by using the power from the servo motor 800. Alternatively, along a solution drainage direction, the mixing piece 130 is a mixing drum disposed at an outer side of the liquid drainage valve core 400. Under the impact of the flowing solution toward the mixing drum, the mixing drum can be rotated so as to achieve movable mixing effect.

In another specific embodiment, the mixing piece 130 is fixedly disposed at the water outlet below the mixing chamber 103. The mixing piece 130 is provided with a plurality of flow choking structures to increase the mixing effect. For example, a flow choking block or flow choking column and the like is disposed on a surface of the mixing piece 130. Those skilled in the arts shall understand that the mixing piece 130 can also be disposed inside the mixing chamber 103. The number of the mixing pieces 130 is not limited herein. In a preferred solution, the mixing pieces 130 are disposed in parallel in three rows to complete the mixing work of the mixed solutions at the water outlet of the mixing valve and ensure the mixed solutions flowing through the water outlet are uniformly mixed, thereby improving the utilization rate of the mixed solution.

As shown in FIG. 3, in order to make the valve body 100 easy to clean and maintain, an end plate 140 which is a detachable structure is further disposed close to the water outlet of the mixing chamber 103, which helps subsequent repair work. Further, with the help of tightening screws, the sealing of the apparatus can be ensured.

Furthermore, two connection openings 150 may be further disposed at the bottom of the water outlet of the mixing valve to help pipe connection. Further, an end cover is disposed to achieve sealing during disuse of the mixing valve.

As shown in FIG. 4, in practical applications, the solutions are not limited to two solutions and in most cases, there are more than two solutions. In order to meet the use requirements, in one embodiment, the mixing valve further includes a second transmission piece 160 in transmission connection with the rotary shaft 500, and a plurality of mixing valves are in transmission connection with the second transmission piece 160. Specifically, the second transmission piece 160 includes a third bevel gear 161 in transmission connection with the first bevel gear 901 on the rotary shaft 500, and the third bevel gear 161 drives an external connection gear 162 to rotate by a shaft. Furthermore, the external connection gear 162 and the third bevel gear 161 can be removable. The external connection gear 162 can be externally connected with a plurality of mixing valves to further meet the needs of controlling multiple mixed solutions with the same power source.

In practical applications, a bidirectionally-movable scraping plate may be disposed in the inner chamber of the valve body 100 to perform up and down reciprocating operation for cleaning the solutions clinging to an inner wall of the inner chamber, helping subsequent operation.

The technical solutions claimed by the present disclosure are not limited to the above embodiments. It should be pointed out that combination of the technical solution of any one embodiment with the technical solutions of other one or more embodiments shall fall within the scope of protection of the present disclosure. Although the present disclosure has been detailed with general descriptions and specific embodiments as above, it is obvious that those skilled in the arts can make some modifications or improvements to the present disclosure. Therefore, all these modifications or improvements made without departing from the spirit of the present disclosure shall all fall within the scope of protection of the present disclosure.

The invention claimed is:

1. A large-volume liquid fixed-ratio multi-batch mixing valve, comprising:
   a valve body, comprising a first inlet liquid chamber, a second inlet liquid chamber and a mixing chamber;
   a first valve core, disposed in the first inlet liquid chamber to control liquid inflow into the first inlet liquid chamber;
   a second valve core, disposed in the second inlet liquid chamber to control liquid inflow into the second inlet liquid chamber;
   a liquid drainage valve core, disposed in the mixing chamber to control liquid drainage;
   a rotary shaft, disposed in the valve body and driven to rotate;
   a first impeller, fixed on the rotary shaft, wherein the first impeller is capable of rotating along with the rotary shaft to enable the first inlet liquid chamber and the second inlet liquid chamber to be communicated and cut off alternately, and the first valve core is capable of rotating in synchronization with the first impeller to close upon the communication of the first inlet liquid chamber and the second inlet liquid chamber and open upon the cutoff of the first inlet liquid chamber and the second inlet liquid chamber;
   a second impeller, fixed on the rotary shaft, wherein the second impeller is capable of rotating along with the rotary shaft to enable the second inlet liquid chamber and the mixing chamber to be alternately communicated and cut off, and the second valve core is capable of rotating in synchronization with the second impeller to close upon the communication of the second inlet liquid chamber and the mixing chamber and open upon the cutoff of the second inlet liquid chamber and the mixing chamber;

wherein the first impeller and the second impeller are disposed symmetrically around the rotary shaft to form an inverse proportional relationship between communication aperture sizes.

2. The large-volume liquid fixed-ratio multi-batch mixing valve of claim 1, wherein an opening-closing angle of the first valve core is in positive proportional relationship with the communication aperture size formed during the rotation of the first impeller; and an opening-closing angle of the second valve core is in positive proportional relationship with the communication aperture size formed during the rotation of the second impeller.

3. The large-volume liquid fixed-ratio multi-batch mixing valve of claim 1, wherein the first valve core and the second valve core are respectively in transmission connection with the rotary shaft such that the first valve core and the second valve core are rotated under the drive of the rotary shaft.

4. The large-volume liquid fixed-ratio multi-batch mixing valve of claim 3, wherein the first valve core and the second valve core are connected with the rotary shaft respectively by a first transmission piece, and a plurality of first transmission pieces are replaceably mounted in the valve body, where each of the first transmission pieces has a different transmission ratio.

5. The large-volume liquid fixed-ratio multi-batch mixing valve of claim 1, wherein the liquid drainage valve core comprises a coarse adjustment mechanism movable relative to a liquid drainage opening of the mixing chamber and a fine adjustment mechanism opposed to the coarse adjusting mechanism.

6. The large-volume liquid fixed-ratio multi-batch mixing valve of claim 5, wherein the liquid drainage valve core comprises an adjustment net provided with a plurality of water-out net holes, and the coarse adjustment mechanism and the fine adjustment mechanism are movable relative to the adjustment net respectively to block a water baffle plate of the water-out net holes.

7. The large-volume liquid fixed-ratio multi-batch mixing valve of claim 6, wherein the coarse adjustment mechanism is provided with a plurality of water-through net holes and the coarse adjustment mechanism is movable relative to the adjustment net to staggeredly adjust a flow rate by the water-through net holes and the water-out net holes.

8. The large-volume liquid fixed-ratio multi-batch mixing valve of claim 1, further comprising a mixing piece, which is disposed in the mixing chamber.

9. The large-volume liquid fixed-ratio multi-batch mixing valve of claim 8, wherein along a solution drainage direction, the mixing piece is a mixing drum disposed at an outer side of the liquid drainage valve core.

10. The large-volume liquid fixed-ratio multi-batch mixing valve of claim 1, further comprising a second transmission piece in transmission connection with the rotary shaft, wherein a plurality of mixing valves are in transmission connection via the second transmission piece.

* * * * *